United States Patent
Dabosville et al.

(10) Patent No.: US 10,459,848 B2
(45) Date of Patent: Oct. 29, 2019

(54) METHOD FOR OPTIMISING MEMORY WRITING IN A DEVICE

(71) Applicant: SAFRAN IDENTITY & SECURITY, Issy les Moulineaux (FR)

(72) Inventors: Guillaume Dabosville, Issy les Moulineaux (FR); Philippe Gislard, Issy les Moulineaux (FR); Victor Servant, Issy les Moulineaux (FR)

(73) Assignee: SAFRAN IDENTITY & SECURITY, Issy les Moulineaux (FR)

( * ) Notice: Subject to any disclaimer, the term of this patent is extended or adjusted under 35 U.S.C. 154(b) by 187 days.

(21) Appl. No.: 15/497,763

(22) Filed: Apr. 26, 2017

(65) Prior Publication Data

US 2017/0315933 A1 Nov. 2, 2017

(30) Foreign Application Priority Data

May 2, 2016 (FR) .................................... 16 53944

(51) Int. Cl.
*G06F 21/00* (2013.01)
*G06F 12/14* (2006.01)
(Continued)

(52) U.S. Cl.
CPC .......... *G06F 12/1408* (2013.01); *G06F 3/065* (2013.01); *G06F 3/0619* (2013.01);
(Continued)

(58) Field of Classification Search
CPC ............... G06F 12/1408; G06F 3/0619; G06F 12/1425; G06F 12/0223; G06F 12/1433;
(Continued)

(56) References Cited

U.S. PATENT DOCUMENTS

| | | | | | |
|---|---|---|---|---|---|
| 4,742,215 | A | * | 5/1988 | Daughters | G06F 21/77 235/380 |
| 5,212,369 | A | * | 5/1993 | Karlisch | G06K 7/0008 235/375 |

(Continued)

FOREIGN PATENT DOCUMENTS

WO 2015/127461 A1 8/2015

OTHER PUBLICATIONS

Jan. 16, 2017 Search Report issued in French Patent Application No. 1653944.

*Primary Examiner* — Shin-Hon (Eric) Chen
(74) *Attorney, Agent, or Firm* — Oliff PLC; R. Brian Drozd (57) ABSTRACT

Provided is a method for optimising memory writing in a device implementing a cryptography module and a client module calling functions implemented by the cryptography module. The device includes a random access memory including a first memory zone that is secured and dedicated to the cryptography module and a second memory zone dedicated to the client module. When the client module calls a series of functions implemented by the cryptography module including a first function and at least one second function, with each second function executed following the first function or from a further second function and providing a runtime result added to a runtime result of the preceding series function, each runtime result is added to a value contained in a buffer memory allocated in the first memory. The buffer memory value is copied to the second memory zone following the execution of the last function of the series.

7 Claims, 3 Drawing Sheets

(51) Int. Cl.
*G06F 3/06* (2006.01)
*G06F 12/02* (2006.01)
*G06Q 20/34* (2012.01)

(52) U.S. Cl.
CPC ........ *G06F 3/0685* (2013.01); *G06F 12/0223* (2013.01); *G06F 12/1425* (2013.01); *G06F 12/1433* (2013.01); *G06Q 20/35765* (2013.01); *G06F 2212/1052* (2013.01); *G06F 2212/177* (2013.01); *G06F 2212/2532* (2013.01)

(58) Field of Classification Search
CPC ................. G06F 3/0685; G06F 3/065; G06F 2212/2532; G06F 2212/177; G06F 2212/1052; G06Q 20/35765
USPC ......................................................... 730/190
See application file for complete search history.

(56) References Cited

U.S. PATENT DOCUMENTS

| | | | | |
|---|---|---|---|---|
| 5,963,980 | A * | 10/1999 | Coulier | G06Q 20/341 235/380 |
| 6,325,293 | B1 * | 12/2001 | Moreno | G06Q 20/32 235/380 |
| 9,721,104 | B2 * | 8/2017 | Nemiroff | G06F 21/575 |
| 9,734,092 | B2 * | 8/2017 | Horovitz | G06Q 20/32 235/380 |
| 9,767,320 | B2 * | 9/2017 | Sharp | G06K 7/0008 235/375 |
| 10,102,391 | B2 * | 10/2018 | Sharp | G06F 21/77 235/380 |
| 2003/0131250 | A1 * | 7/2003 | Quere | G06F 21/72 713/189 |
| 2004/0019622 | A1 * | 1/2004 | Elbe | G06F 7/722 708/492 |
| 2004/0088554 | A1 * | 5/2004 | Kawaguchi | G06F 12/1433 713/189 |
| 2006/0010192 | A1 * | 1/2006 | Fischer | G06F 7/722 708/620 |
| 2010/0211727 | A1 * | 8/2010 | Bailly | G06F 12/1425 711/104 |
| 2010/0281273 | A1 * | 11/2010 | Lee | G06F 21/72 713/190 |
| 2011/0083020 | A1 * | 4/2011 | Michiels | H04L 9/004 713/189 |
| 2013/0132735 | A1 * | 5/2013 | Kottilingal | G06F 21/6218 713/189 |
| 2014/0068704 | A1 * | 3/2014 | Grewal | H04L 63/0428 726/1 |
| 2015/0052325 | A1 * | 2/2015 | Persson | G06F 12/1458 711/163 |
| 2015/0244716 | A1 * | 8/2015 | Potlapally | H04L 63/064 713/155 |
| 2017/0083724 | A1 * | 3/2017 | Chhabra | G06F 21/72 |
| 2019/0130120 | A1 * | 5/2019 | Lal | G06F 21/602 |

\* cited by examiner

METHOD FOR OPTIMISING MEMORY WRITING IN A DEVICE

The invention relates to a method for optimising memory writing in a device implementing a plurality of software modules, a first software module comprising functions allowing a cryptography algorithm to be implemented, and to a device implementing said method.

More specifically, the invention is suitable for the field of chip cards.

A chip card comprises at least one integrated circuit capable of containing and processing information. The integrated circuit, i.e. the chip, contains a microprocessor or a microcontroller capable of processing information that is stored in a memory.

The microprocessor (or the microcontroller) allows an operating system to be implemented within the chip card. Java Card is technology that allows to define an operating system that basically provides a runtime environment for a sub-set of a programming language called Java, said sub-set being specifically intended for applications for chip cards. This runtime environment, called JCRE (Java Card Runtime Environment), comprises an interpreter, called virtual machine or JCVM (Java Card Virtual Machine), that allows execution of intermediate codes that correspond to functions or applications, also called applets, installed in a non-volatile memory on the chip card. The operating system calls libraries, called native libraries, containing basic functions (APIs "Application Programming Interfaces") that are useful for developing applications for chip cards.

A chip card is a device that is mainly used as a personal identification means, such as a payment means, or as a means of proof of subscription to prepaid services. Each of the aforementioned uses can be considered to be sensitive, particularly as they use confidential data that is contained in the chip card. A chip card is intended to exchange confidential data with other devices. For example, a chip card that is used as a payment means exchanges confidential data with payment terminals. These data exchanges must be undertaken securely in order to prevent any illicit retrieval of confidential data. It is for this reason that most chip cards comprise native libraries implementing cryptography algorithms.

A cryptography algorithm is an algorithm that aims to protect data, by guaranteeing their confidentiality, authenticity or integrity, for example, using mathematics. However, the fact that a cryptography algorithm is secured from a mathematical perspective does not necessarily guarantee that the practical implementation of this cryptography algorithm by an electronic device will be secured.

Indeed, cryptography algorithms are often accurately described in publicly accessible specifications. Moreover, it is well known that when an unprotected electronic device 'naively' executes software implementing a cryptography algorithm, i.e. in a way that simply produces an expected numerical result from an input data item according to the specification of this algorithm, it is often possible for confidential information to be obtained on the sequence of operations of the cryptography algorithm by carrying out external observations of certain operating parameters of the electronic device. In this way, an attacker wishing to obtain confidential data from the electronic device can analyse any noise generated by the electronic device, electromagnetic emissions, a thermal image or even electricity consumption of the electronic device in order to obtain confidential data.

In order to be protected against attacks, the electronic device itself can be secured. For example, noise can be superposed on the power supply in order to make it difficult to operate, the electricity consumption can be smoothed (for example, using capacitors), electromagnetic emissions can be limited using suitable shielding, etc.

A known protection method involves masking the confidential data. The confidential data can, for example, be encryption keys and/or an input message that must, for example, be encrypted by a cryptography algorithm, and/or certain intermediate data handled when the cryptography algorithm is executed. Several masking protection methods have been proposed. Thus, masking of the additive type can be cited where a data item X handled by a cryptography algorithm is replaced by a masked data item $X \oplus M$, where $\oplus$ denotes one or exclusive and M is a masking data item that can be different upon each use.

A chip card, such as that which is produced by a chip card supplier, can be considered to be a generic chip card that can have a plurality of uses. This chip card comprises a certain number of native libraries allowing various functions to be implemented on the chip card, including libraries that allow to implement software modules, called cryptography modules, that are capable of implementing various functions handling confidential data such as, for example, functions relating to cryptography algorithms and/or lower level functions implementing modular arithmetic (i.e. addition, subtraction, multiplication, etc.). Hereafter, all of the functions implemented by a cryptography module will be combined under the term cryptography functions. In order for this generic card to be able to fulfil a specific use, it may need to be configured a posteriori. For this reason, certain chip card suppliers supply their clients with chip cards into which each client can introduce their own libraries, according to their specific requirements. Each of these libraries, called client libraries, once loaded on a chip card, is capable of implementing software modules, called client modules, granting access to specific client functions, hereafter called client functions. A first software module also can invoke functions implemented by a second software module. In particular, a client module can invoke functions implemented by the cryptography module. Granting access to cryptography functions from a client module can constitute a security breach. Indeed, whilst a cryptography module can be highly secured, for example by using masking methods in the cryptography functions, the security level of a client module can be lower, which can constitute a point of entry for an attack.

In order to limit the risks of clients introducing security breaches into chip cards, chip card suppliers highly restrict data exchanges between the client modules and the cryptography modules. A known method that allows security breaches to be limited involves compartmentalising any executions of the client functions implemented by a client module and of the cryptography functions implemented by a cryptography module, as well as the memory spaces dedicated to these modules. For example, a client module never directly accesses a cryptography function and a client module never accesses a memory zone if this memory zone is not authenticated as not containing confidential data originating from a cryptography module.

When a client module has to call a cryptography function in order to complete an operation, it calls a software module, called interface module, that is implemented by a native library providing an interface between the client module and the cryptography module. In other words, the client module does not directly call cryptography functions but requests that the interface module calls these cryptography functions. An inherent problem of this approach is that, when a client module executes an operation that requires a plurality of intermediate computations, with each intermediate computation using a cryptography function, a succession of copies of variables and of intermediate results is produced in the memory. From a performance perspective, these multiple copies slow down the implementation of the operation of the client module. Furthermore, from a security perspective, it is known that the more copies there are of intermediate results obtained from functions handling confidential data, the greater the risk of making this confidential data accessible to unauthorised persons.

Overcoming these disadvantages of the prior art is preferable. It is particularly preferable for a method and a device to be proposed that allow the exchanges between a client module and a cryptography module to be streamlined in order to obtain shorter execution times, without necessarily increasing the risks of introducing security breaches into the chip cards.

According to a first aspect of the invention, the invention relates to a method for optimising memory writing in a device implementing a plurality of software modules, a first software module comprising functions handling confidential data, a third software module allowing functions, called client functions, of a second software module to call functions, called cryptography functions, of the first software module, the device comprising a random access memory divided into a plurality of memory zones, a first memory zone of the plurality of zones being secured and being able to be used exclusively by the first and third software modules, a second memory zone being able to be used exclusively by the second and third software modules. The method comprises: obtaining a series of client functions comprising a first client function and at least one second client function, each second client function having to be executed following the first client function or a further second client function and providing a runtime result that must be added to a runtime result of the client function preceding it in the series, each client function of the series calling a cryptography function; allocating a buffer memory in the first memory zone and setting this buffer memory to a value that is equal to a predefined value; launching a sequenced execution of each client function of the series, each execution of one of said client functions comprising a call, through the third software module, to the cryptography function affected by said client function, causing said cryptography function to be executed in the first memory zone, the runtime result of said cryptography function being added to the value contained in the buffer memory; and copying, in the second memory zone, the value contained in the buffer memory following the execution of the last client function of the series.

The method prevents intermediate results from being copied between the first memory zone and the second memory zone each time a cryptography function is executed. The number of memory copies is therefore reduced.

According to one embodiment, the first memory zone is read and write blocked by default and is only unblocked when a cryptography function is executed, the second memory zone being read and write blocked each time a cryptography function is executed.

According to one embodiment, the random access memory comprises a third memory zone, through which each data item passes that is exchanged between the first and second software modules from the first memory zone to the second memory zone or from the second memory zone to the first memory zone.

According to one embodiment, each data item exchanged between the first and second software modules is copied from the first memory zone to the second memory zone or from the second memory zone to the first memory zone and, prior to each copying operation, a check is implemented that ensures that the first memory zone does not contain any confidential data and, if the first memory zone contains confidential data, said confidential data is deleted.

According to a second aspect of the invention, the invention relates to a device comprising means for implementing the method according to the first aspect.

According to one embodiment, the device is a chip card.

According to a third aspect of the invention, the invention relates to a computer program comprising instructions for the implementation, by a device, of the method according to the first aspect, when said program is executed by a processor of said device.

According to a fourth aspect, the invention relates to storage means storing a computer program comprising instructions for the implementation, by a device, of the method according to the first aspect, when said program is executed by a processor of said device.

The features of the aforementioned invention, as well as other features, will become more clearly apparent upon reading the following description of an embodiment, said description being provided with reference to the accompanying drawings, in which.

The following description more specifically describes embodiments of the present invention in the context of a chip card. However, the principles that are described herein are applicable to types of cards or electronic devices other than chip cards. For example, the invention is applicable to electronic cards contained in smart phones or in computers implementing an operating system comprising native libraries allowing at least one cryptography module to be implemented or, more broadly, modules handling confidential data, said electronic cards being generic but being able to be adapted to specific client requirements by allowing client libraries to be introduced that allow client modules to be implemented that use functions of the native libraries.

Figure 1:
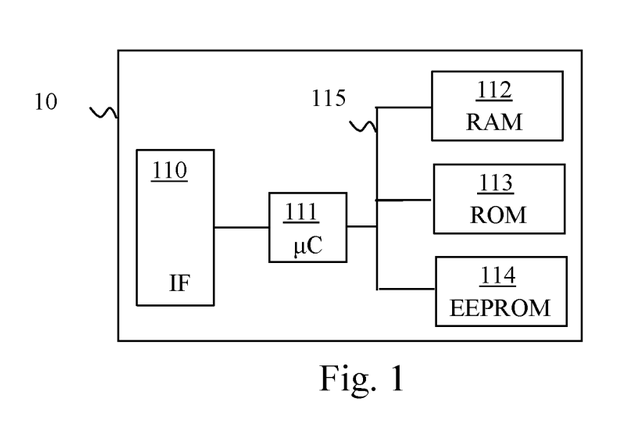
FIG. 1 schematically shows a hardware architecture of a device, such as a chip card, in which the present invention can be implemented.

FIG. 1 schematically shows a hardware architecture of a device 10, in which the present invention can be implemented. In one embodiment, the device 10 is a chip card.

The chip card 10 comprises an interface 110 that is configured to connect the chip card 10 to a card reader (not shown in FIG. 1). The chip card 10 is, for example, a bank card and the card reader is a payment terminal. The interface 110 is configured to allow data exchanges to be carried out between the card reader and the chip card 10, particularly to allow the card reader to send commands to the chip card 10, and also to allow the card reader to supply the chip card 10 with power.

The chip card 10 further comprises a processor, typically in the form of a microcontroller 111 or a microprocessor that is designed to carry out processing within the chip card 10: computations, data transfers, etc.

The chip card 10 further comprises a Random Access Memory RAM 112, a Read Only Memory ROM 113 and a non-volatile memory, such as an EEPROM (Electronically Erasable Programmable ROM) memory 114, for example. The random access memory 112, the read only memory 113 and the non-volatile memory 114 are connected to the microcontroller 111 by a communication bus 115.

The read only memory 113 typically contains instructions causing a JCRE runtime environment to be implemented within the chip card 10, based on the random access memory 112.

The random access memory 112 is used to temporarily store data, such as variables and intermediate results of computations.

The memory 114 contains a set of instructions corresponding to functions provided by libraries (native or client) stored on the chip card 10. These functions are grouped into a plurality of software modules.

When the chip card 10 is supplied with power by the card reader via the interface 110, the microcontroller 111 is capable of executing instructions, particularly in the form of intermediate code, from the read only memory 113 and/or the non-volatile memory 114. Subsequently, when the microcontroller 111 executes (i.e. implements) instructions relating to a function of a software module, it is said, for the sake of simplicity, that the software module executes (i.e. implements) a function. Furthermore, when the microcontroller 111 executes (i.e. implements) instructions relating to a function of a first software module allowing the microcontroller 111 to launch the execution (i.e. an implementation) of a function of a second software module, it is said that the first software module calls the function of the second software module.

It is to be noted that, when the operating system is implemented on an electronic device other than a chip card, the microcontroller 111 is capable of executing instructions loaded in the random access memory RAM 112 from the read only memory ROM 113 and/or the EEPROM memory 114, once said electronic device is supplied with power.

In one embodiment, the chip card 10 comprises a client library called LIB_CLI and a native library called LIB_CRYPTO. The native library LIB_CRYPTO allows a cryptography module to be implemented that provides cryptography functions (i.e. functions handling confidential data such as, for example, functions allowing a cryptography algorithm to be implemented and low-level functions). The client library LIB_CLI allows a client module to be implemented that provides client functions calling cryptography functions of the cryptography module. Each call to a cryptography function by the client module is indirect. Indeed, the chip card 10 further comprises a native library LIB_INTER allowing an interface module to be implemented between the client module and the cryptography module. For example, when the client module calls a cryptography function FCT_CRYPTO of the cryptography module, it supplies the interface module with an identifier of the cryptography function FCT_CRYPTO, which interface module deals with the actual call of the cryptography function FCT_CRYPTO, the cryptography function being implemented by the cryptography module. Furthermore, the interface module deals with copies of parameters and results of functions in the random access memory 112. The use of indirect access by the client module to the cryptography functions through an interface module, as opposed to direct access, allows the risks of security breaches to be limited.

In order to increase the security of the confidential data that is used by the cryptography module, in one embodiment, the random access memory RAM 112 is divided into a plurality of dedicated memory zones. The client module and the cryptography module use distinct, dedicated memory zones, which prevents the client module (i.e. a function that is executed by the client module) from having access to confidential data handled by the cryptography module.

Figure 2:
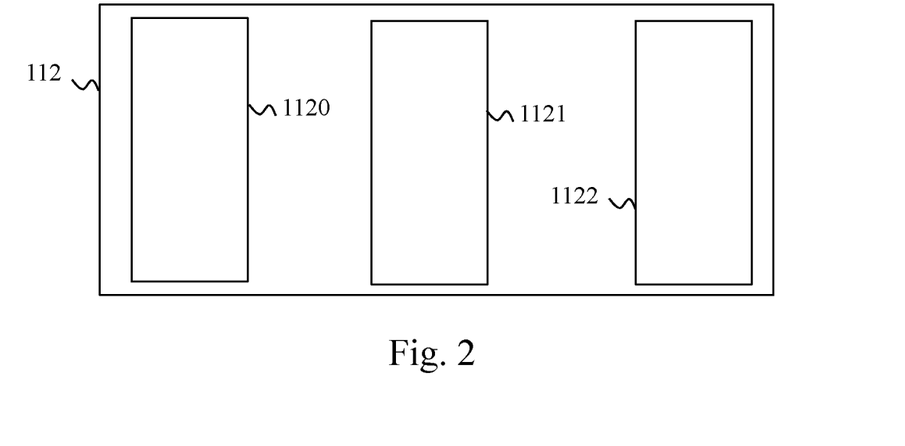
FIG. 2 schematically shows an example of the configuration of a random access memory used in the invention.

FIG. 2 schematically shows an example of the configuration of a random access memory used in the invention.

In one embodiment that corresponds to the example shown in FIG. 2, the random access memory 112 is divided into three memory zones:

one memory zone 1120, called RAM_LIB_CLIENT, dedicated to the client module;

one memory zone 1121, called RAM_CRYPTO, dedicated to the cryptography module;

one memory zone 1122, called RAM_SHARED, dedicated to data sharing between the client module and the cryptography module.

The memory zone RAM_CRYPTO 1121 is a secured memory zone. Indeed, when the cryptography module (i.e. when a cryptography function executed by the cryptography module) handles a confidential data item, this is received by the cryptography module in masked form and is only unmasked in the memory zone RAM_CRYPTO 1121. Furthermore, the client module never has direct access to the memory zone RAM_CRYPTO 1121. It is to be noted that other known security solutions can be used as a replacement or in combination with the solutions cited in this embodiment.

The cryptography module can only read and write in the memory zone RAM_CRYPTO 1121.

The client module can only read and write in the memory zone RAM_LIB_CLIENT 1120.

Only the interface module can read and write in the three memory zones RAM_LIB_CLIENT 1120, RAM_CRYPTO 1121 and RAM_SHARED 1122.

Figure 3:
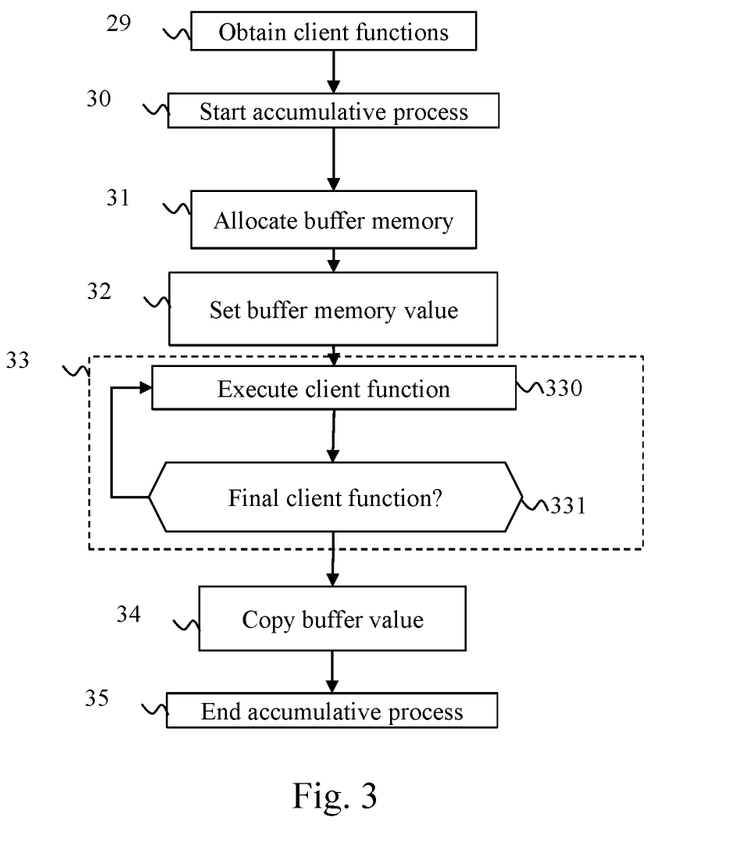
FIG. 3 schematically shows an example of a method according to the invention executing a plurality of functions calling cryptography functions.

FIG. 3 schematically shows an example of a method according to the invention, in which the client module calls cryptography functions.

In order to illustrate this method, the following example of an operation OP will be used:

$$OP: RES_{FINAL}=(r.d)\mod(q)+(k.e)\mod(q),$$

where $RES_{FINAL}$ is a final result of the operation OP, r, d, k, and e are parameters of the operation OP, (x)mod(q) is the modulo operation computing the remainder of the Euclidean division of a variable x by a variable q.

The operation OP can be divided into two sub-operations:

$$RES_{INTER}^{1}=(r.d)\mod(q)$$

$$RES_{INTER}^{2}=(k.e)\mod(q),$$

where $RES_{INTER}^{1}$ and $RES_{INTER}^{2}$ are intermediate results. The operation OP has been stored in the form of a computer program, for example in the form of intermediate code, in the non-volatile memory 114 of the chip card. This program comprises a series of client functions. This series of client functions comprises a first client function FCT_CLI_1 taking the two parameters r and d as input and implementing the sub-operation (r.d)mod(q) and a second client function FCT_CLI_2 taking the two parameters k and e as input and implementing the sub-operation (k.e)mod(q). The result of the sub-operation (k.e)mod(q) must be added to the result of the sub-operation (r.d)mod(q). Each client function of the series of client functions calls a cryptography function to implement the operation OP. In the example of the operation OP, each client function (FCT_CLI_1 and FCT_CLI_2) calls the same cryptography function FCT_CRYPTO carrying out the sub-operation (i.j)mod(q), where i and j are two variables, for which a computation of a modulo product q is required.

It is to be noted that the series of client functions can contain a first client function and a plurality of second client functions, each second client function having to be executed following the first client function or a further second client function and providing a runtime result that must be added to a runtime result of the client function preceding it in the series, each client function of the series calling a cryptography function, with different cryptography functions being able to be called.

As has been seen above, each call to a cryptography function by the client module occurs through the interface module. For example, in the computer program, calling the cryptography function FCT_CRYPTO by the client function FCT_CLI_1 occurs through an interface function FCT_INTER of the interface module that takes an identifier of the cryptography function FCT_CRYPTO and the parameters r and d as input.

When the chip card 10 is supplied with power by the card reader via the interface 110, the microcontroller 111 executes the computer program implementing the operation OP by loading said program from the non-volatile memory 114.

In a step 29, the client module (i.e. the microcontroller 111 executing instructions relating to a function of the client module) obtains the list of client functions.

In a step 30, the client module starts an accumulative process by notifying the interface module that an accumulative process will start (i.e. the client module executes a client function transmitting information to the interface module that represents the start of an accumulative process, so that the interface module takes into account said information when it executes interface functions). When the interface module is notified that an accumulative process will start, it notifies the cryptography module as such (i.e. the interface module executes an interface function transmitting information to the cryptography module that represents the start of an accumulative process, so that the cryptography module takes into account said information when it executes cryptography functions). An accumulative process is a series of functions, each function providing a result that must be added to a value contained in the same buffer memory.

In a step 31, the interface module allocates a buffer memory in the memory zone RAM_CRYPTO 1121. In the example of the operation OP, this buffer memory is intended to accumulate the results of each execution of the cryptography function FCT_CRYPTO.

In a step 32, the interface module sets the buffer memory to a predefined value. In one embodiment, the buffer memory is set to zero.

In a step 33, the client module launches a sequential execution of each client function of the series. Each execution of one of said client functions comprises a call, through the interface module, to the cryptography function affected by said client function, causing the cryptography module to execute said cryptography function in the memory zone RAM_CRYPTO 1121. The runtime result of said cryptography function is added to the value contained in the buffer memory by the cryptography module.

Therefore, the step 33 is an iterative step. During each iteration, during a step 330 that will be described with reference to FIG. 4, the client module executes one of the client functions of the series.

Figure 4:
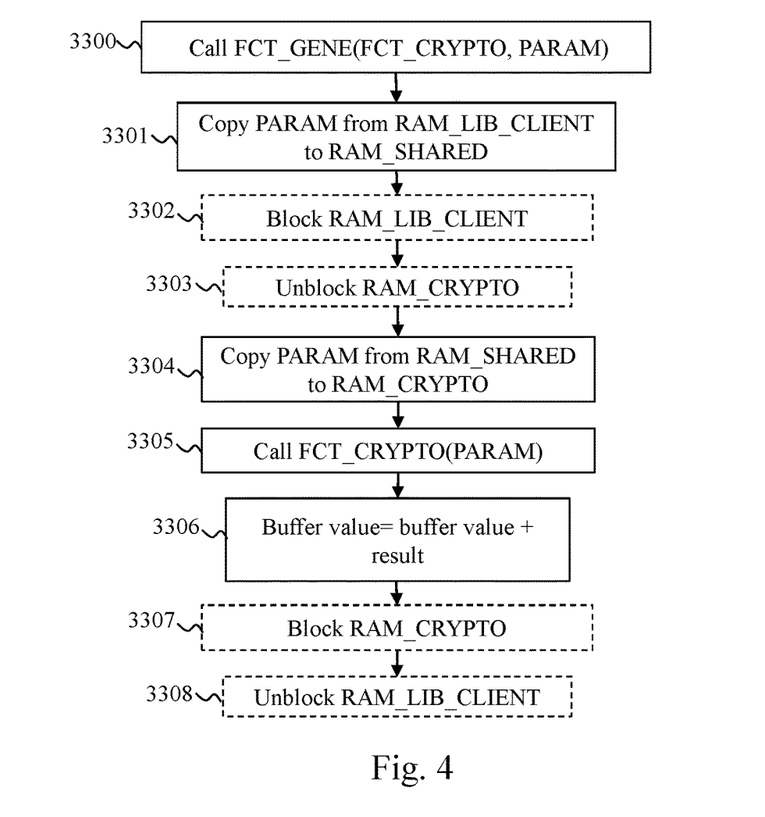
FIG. 4 schematically shows an execution of a client function calling a cryptography function.

FIG. 4 schematically shows an execution of a client function of the series calling the cryptography function FTC_CRYPTO.

In a step 3300, the client module calls the interface function FCT_INTER with the identifier of the cryptography function FCT_CRYPTO and the two parameters r and d as parameters.

In a step 3301, the interface module copies the two parameters r and d from the memory zone RAM_LIB_CLIENT 1120 to the memory zone RAM_SHARED 1122.

In a step 3304, the interface module copies the two parameters r and d from the memory zone RAM_SHARED 1120 to the memory zone RAM_CRYPTO 1122.

In a step 3305, the interface module calls the cryptography function FCT_CRYPTO with the parameters r and d, which causes the cryptography function FCT_CRYPTO to be executed by the cryptography module.

In a step 3306, the cryptography module adds the runtime result of the cryptography function FCT_CRYPTO to the value of the buffer memory and retains the value obtained in the buffer memory.

With further reference to FIG. 3, during a step 331, the client module checks if the client function executed during the step 330 is the last client function of the series. If this client function is not the last of the series, the client module re-executes the step 330 with the next function in the series. In the example of the operation OP, the client module carries out two iterations during the step 33, a first iteration during which it implements the client function FCT_CLI_1 and adds the result of this implementation to the value of the buffer memory (at a zero value during the first iteration) and a second iteration during which it implements the client function FCT_CLI_2 and adds the result of this implementation to the value of the buffer memory (to the runtime result of the client function FCT_CLI_1 during the second iteration).

When all of the client functions of the series have been executed, the client module requests the value of the buffer memory from the interface module. The interface module then implements a step 34, which will be described hereafter with reference to FIG. 5, during which it copies the value contained in the buffer memory to the memory zone RAM_LIB_CLIENT 1120.

In a step 35, following the implementation of the step 34, the interface module knows that the accumulative process is complete. The interface module then deallocates the buffer memory.

Figure 5:
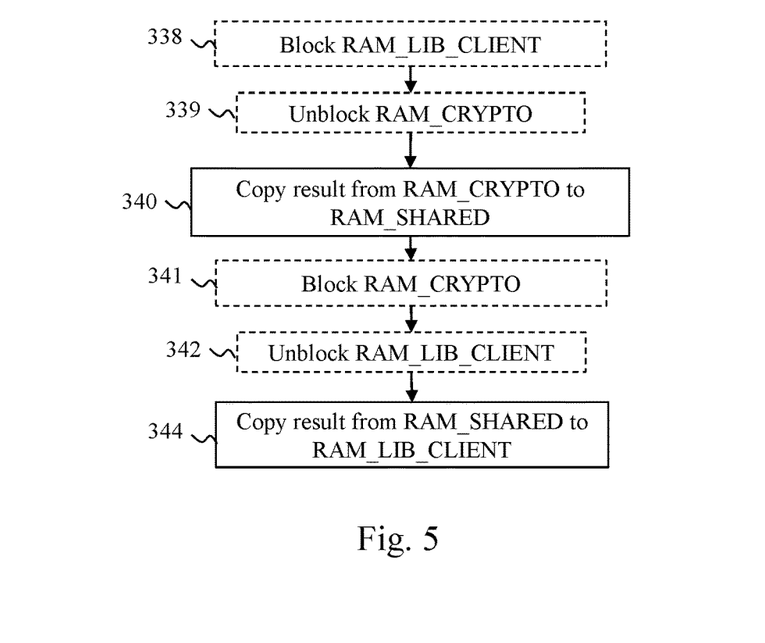
FIG. 5 describes a step of copying a runtime result of a series of client functions calling cryptography functions from a secured memory zone to an unsecured memory zone.

FIG. 5 describes the step 34 of copying the runtime result of the series of client functions FCT_CLI_1 and FCT_CLI_2 calling the cryptography function FCT_CRYPTO from the buffer memory to the memory zone RAM_LIB_CLIENT 1120.

In steps 340 and 344, the interface module executes an interface function FCT_INTER 2. During the step 340, the interface module copies the runtime result of the series of client functions from the buffer memory to the memory zone RAM_SHARED 1122. During the step 344, the interface module copies the runtime result of the series of client functions from the memory zone RAM_SHARED 1122 to the memory zone RAM_LIB_CLIENT 1120.

In one embodiment, the memory zone RAM_CRYPTO 1121 is blocked by default so as to prevent any reading and writing in this memory zone. In this embodiment, two steps 3302 and 3303 are included between the steps 3301 and 3304. During the step 3302, the interface module blocks the memory zone RAM_LIB_CLIENT 1120. During the step 3303, the interface module unblocks the memory zone RAM_CRYPTO 1121. Furthermore, in this embodiment, the step 3306 is followed by two steps 3307 and 3308. During the step 3307, the interface module blocks the memory zone RAM_CRYPTO 1121. During the step 3308, the interface module unblocks the memory zone RAM_LIB_CLIENT 1120. An identical principle is applied during the step 34, the step 340 being preceded by two steps 338 and 339. During the step 338, the interface module blocks the memory zone RAM_LIB_CLIENT 1120. During the step 339, the interface module unblocks the memory zone RAM_CRYPTO 1121. Two steps 341 and 342 are included between the steps 340 and 344. During the step 341, the interface module blocks the memory zone RAM_CRYPTO 1121. During the step 342, the interface module unblocks the memory zone RAM_LIB_CLIENT 1120. This embodiment enhances security since any access to the memory zone RAM_CRYPTO is only authorised when absolutely necessary.

In one embodiment, the random access memory 112 only comprises the memory zone RAM_LIB_CLIENT and the memory zone RAM_CRYPTO. In this embodiment, the interface module directly copies from the memory zone RAM_LIB_CLIENT to the memory zone RAM_CRYPTO and vice versa. However, prior to each copying operation in the memory zone RAM_CRYPTO, the interface module carries out a check to ensure that the memory zone RAM_CRYPTO does not contain any confidential data and, if the memory zone RAM_CRYPTO contains confidential data, it deletes this confidential data.

The invention claimed is:

1. A method for optimizing memory writing in a device implementing a plurality of software modules, a first software module comprising functions handling confidential data, a third software module allowing functions, called client functions, of a second software module to call functions, called cryptography functions, of the first software module, each software function being stored in a non-volatile memory of said device, and being executed in a runtime environment comprising an interpreter stored in a read only memory of said device, said device comprising a random access memory divided into a plurality of memory zones, a first memory zone of the plurality being secured and being able to be used exclusively by the first and third software modules, a second memory zone being able to be used exclusively by the second and third software modules, wherein the method comprises:
  obtaining a series of client functions comprising a first client function and at least one second client function, each second client function having to be executed following the first client function or a further second client function and providing a runtime result that must be added to a runtime result of the client function preceding it in the series, each client function of the series calling a cryptography function;
  allocating a buffer memory in the first memory zone and setting this buffer memory to a value equal to a predefined value;
  launching a sequenced execution of each client function of the series, each execution of one of said client functions comprising a call, through the third software module, to the cryptography function affected by said client function, causing said cryptography function to be executed in the first memory zone, the runtime result of said cryptography function being added to the value contained in the buffer memory; and
  copying, in the second memory zone, the value contained in the buffer memory following the execution of the last client function of the series.

2. The method according to claim 1, wherein the first memory zone is read and write blocked by default and is only unblocked when a cryptography function is executed, the second memory zone being read and write blocked each time a cryptography function is executed.

3. The method according to claim 1, wherein the random access memory comprises a third memory zone, through which each data item passes that is exchanged between the first and second software modules from the first memory zone to the second memory zone or from the second memory zone to the first memory zone.

4. The method according to claim 1, wherein each data item exchanged between the first and second software modules is copied from the first memory zone to the second memory zone or from the second memory zone to the first memory zone and, prior to each copying operation, a check is implemented that ensures that the first memory zone does not contain any confidential data and, if the first memory zone contains confidential data, said confidential data is deleted.

5. A non-transitory computer readable storage medium storing a computer program product comprising instructions causing the implementation of the method according to claim 1 when the instructions are executed by the device implementing a plurality of software modules after having been loaded by said device.

6. A device implementing a plurality of software modules, a first software module comprising functions handling confidential data, a third software module allowing functions, called client functions, of a second software module to call functions, called cryptography functions, of the first software module, each software function being stored in a non-volatile memory of said device, and being executed in a runtime environment comprising an interpreter stored in a read only memory of said device, said device comprising a random access memory divided into a plurality of memory zones, a first memory zone of the plurality being secured and being able to be used exclusively by the first and third software modules, a second memory zone being able to be used exclusively by the second and third software modules, wherein the device comprises electronic circuitry adapted for:
  obtaining a series of client functions comprising a first client function and at least one second client function, each second client function having to be executed following the first client function or a further second client function and providing a runtime result that must be added to a runtime result of the client function preceding it in the series, each client function of the series calling a cryptography function;
  allocating a buffer memory in the first memory zone and setting this buffer memory to a value equal to a predefined value;
  launching a sequenced execution of each client function of the series, each execution of one of said client functions comprising a call, through the third software module, to the cryptography function affected by said client function, causing said cryptography function to be executed in the first memory zone, the runtime result of said cryptography function being added to the value contained in the buffer memory; and copying, in the second memory zone, the value contained in the buffer memory following the execution of the last client function of the series.

7. The method according to claim 6, wherein the device is chip card.

* * * * *